Feb. 27, 1940.  J. H. BALLARD ET AL  2,191,435
BEARING MEMBER
Filed Feb. 27, 1939
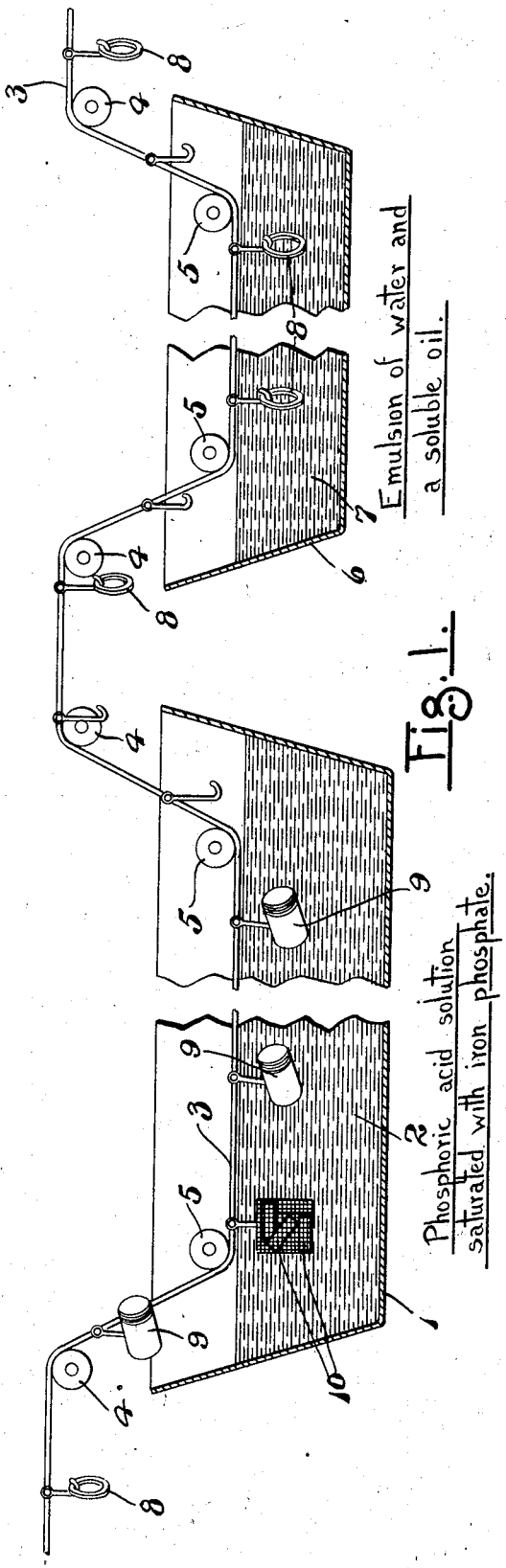
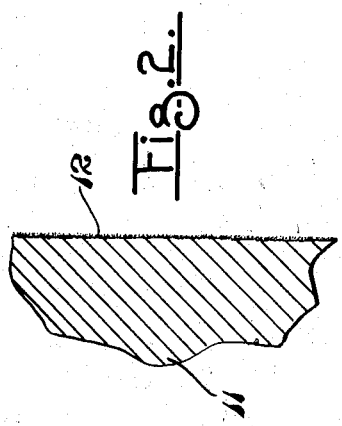
Inventors
John H. Ballard
William H. Spencer
Attorneys Patented Feb. 27, 1940

2,191,435

UNITED STATES PATENT OFFICE 2,191,435

BEARING MEMBER

John H. Ballard and William H. Spencer, Muskegon, Mich., assignors to Sealed Power Corporation, Muskegon, Mich., a corporation of Michigan Application February 27, 1939, Serial No. 258,816

4 Claims. (Cl. 148—6.5)

This invention relates to the process and method of treating surfaces of ferrous articles, which articles are to be used as bearings or in a similar manner, so that the surfaces have movable contact with relation to adjacent surfaces, as for example with piston rings against the walls of cylinders, pistons likewise against the walls of cylinders, wrist pins in their bearings, or shafts in their bearings and in the many other relations not specifically mentioned where there is a substantially rubbing contact of one surface against another. In connection with such surfaces which all may be termed bearing surfaces, one against the other, damaging and detrimental effects will occur if for any reason the lubrication generally present to prevent scoring and wear should be cut through either wholly or partially, with the result of what in effect is a cold welding connection at surface points between the metal of one article with that of the other. We have found it to be most pronounced in the case of pistons and piston rings and the inner walls of cylinders in which such pistons and piston rings operate, wherein usually during the initial period of operation of a new engine there is detrimental scuffing and scoring of the surfaces of pistons and piston rings and a corresponding scuffing and scoring of the adjacent inner cylinder walls. The great increase in rotative speeds of engine crank shafts with the corresponding increase in reciprocations of pistons and the high compression of the fuel mixture above the pistons acts to provide very severe conditions of operation which the pistons, cylinders and piston rings and also the wrist pins of the pistons are obliged to withstand, so that under such severe conditions of operation and particularly with the surfaces of the pistons and rings as they are left by the last machining operations upon them, there is a cutting through or wiping off of the lubrication oil films and surface films upon the adjacent bearing surfaces which brings parts of the metals of the adjacent surfaces sufficiently close together that they come within the radius of molecular attraction of each other, with a resultant welding or partial welding of points or particles of one of the bearing members with the other. This produces scoring, scuffing and otherwise damages said surfaces. And as the piston and the piston rings are moving relatively to the cylinder walls, any such molecular cohesion will, because of such movement, cause a resultant breaking loose of cohering parts producing imperfect, roughened and scored surfaces. This will occur reciprocally upon both the surfaces of pistons and piston rings and upon the inner walls of the cylinders and also will similarly occur upon adjacent surfaces of relatively moving ferrous metal parts wherein there is sufficiently severe conditions to withstand that such breaking down of lubrication and surface films partially takes place in connection with any two reciprocating or rotating contacting bearing surfaces.

The problem is a serious one in connection with internal combustion engines and in many other relations.

We have heretofore filed an application, Serial No. 183,240, filed January 3, 1938, of which the present application is a continuation in part. The primary purpose and object of the present invention is to provide a practical, useful and serviceable method or process which we have devised, and to which the outer bearing surfaces of ferrous articles which are used in a bearing relation with respect to each other may be treated, and from such treatment there will be provided on the bearing surfaces a coating, the presence of which eliminates scoring, scuffing, cutting and excessive wear. The process of this invention is particularly useful in conjunction with piston rings and pistons, also with cylinder sleeves of ferrous metal, cast in machines and inserted into the engine blocks and also, as previously stated, in substantially all places where there is a heavy bearing duty undergone by two ferrous metallic members.

An understanding of the invention may be had from the following description, taken in connection with the accompanying drawing, in which:

Fig. 1 is a side elevation in section diagrammatically illustrating the process and method which we have invented to secure the results stated, and Fig. 2 is a fragmentary enlarged section of an article which has been treated in accordance with our method and indicating the surface coating which is produced.

In the drawing, two tanks are shown of which the first tank 1 contains a solution, basically a phosphoric acid water solution saturated with iron phosphate. In practice the preferred solution, which is indicated at 2 in the tank 1, is made by taking a predetermined quantity of a concentrated solution of phosphoric acid which has had iron dissolved therein to an extent that it will absorb no more of iron phosphates and in which there is preferably a quantity of black oxide of manganese. Such solution is diluted so that the resultant dilute solution which is used in the tank contains approximately 6% free phosphoric acid. As an example, 1 gallon of the concentrated solution of phosphoric acid saturated with iron phosphate and in which there may be from one to three pounds of black oxide of manganese, two pounds being usually preferred, by adding nine gallons of water thereto will make ten gallons of the diluted solution which will have approximately 6% free phosphoric acid. It is to be understood however that the percentage of free phosphoric acid may be somewhat varied and does not necessarily have to be within extremely close limits of the 6% stated.

In using the solution with our method or process, it is preferably used at a temperature between 200 and 210° Fahr. The ferrous articles to be treated in practice are carried by an endless cable 3 which has hooks in the length thereof at spaced intervals upon which the articles are suspended in the lower run of the cable. The lower run of the cable adjacent the entrance end of the tank 1 rides over an idle pulley 4 and is thence directed downwardly under pulleys 5 which may be mounted upon the sides of the tank, and thence the cable leaves the tank before reaching the opposite end over other upwardly positioned pulleys 4 to a point above a second tank 6 wherein there is a finishing and washing emulsion of water carrying in suspension or in emulsion a soluble oil, the lower run of the cable being directed downwardly over the surface of such emulsion indicated at 7 by like pulleys 5 the same as in the first tank 2.

The articles shown as carried by and suspended from the lower run of the cable by the spaced hooks, may be piston rings, as indicated at 8, pistons at 9, or wrist pins and the like which are shown carried in a foraminous cage as at 10; and of course many other articles which may have bearing surfaces may be carried by the cable. With the phosphoric acid solution saturated with iron phosphate, diluted as described and heated to a temperature approaching but less than 212° Fahr., the several ferrous articles which are to be treated enter the solution 2 at one end of the tank and are carried immersed in such solution for a period approximating twelve minutes. It is to be understood that the specific disclosure made of a practical and operative solution and temperatures and the time of treatment, because so explicitly stated, is not to be used as a means to limit the invention. The temperature of the solution may be lowered, in which case the action of the acid on the iron will be slower and the time required be longer. The time that the ferrous articles which are to be treated should be immersed in the phosphoric acid iron phosphate saturate solution, is that in which the reaction will be completed and will be evidenced by a cessation of the evolution of gas apparently from the articles. When the articles are first immersed in the solution, gas is evolved and they should remain in the solution until gas evolution ceases. Such is the test for the period of immersion of the articles in such solution. The passage of the articles after this treatment through the water and oil emulsion solution 7 in the tank 6 washes the articles and removes acid which adheres to and is dragged out from the first tank as they pass therefrom to the second tank. It has been found that the action of the oil emulsion upon the coating produced on the articles after the treatment in the acid bath fixes or stabilizes such coating, renders it of an attractive and uniform dark or black color, and stops any tendency of the coating which has been produced to separate from the iron of the article treated, such as the piston ring, piston, or other bearing member.

The action of the acid upon the ferrous material of said articles produces a continuous coating of iron phosphate over all surfaces exposed, the composition of which is of a ferruoso-ferric phosphate character. The thickness of the coating produced may approximate one-half of one-thousandth of an inch. It is measurable and can be separated in part at least from the iron beneath by heating to a white heat and very quickly quenching in cold water. In use as in engines on pistons, piston rings and other articles which undergo bearing service, such coating does not separate, but remains as an unbroken, firmly adherent or interconnected tough outer surface coating. There is also a result occurring from the washing of the articles after the acid bath treatment in the water and oil emulsion that the coating appears to have absorbed some oil so that even without the use of lubricating oil in an engine, there appears to be no appreciable scoring, roughing, scuffing or other damage to the bearing surfaces which carry such coatings. The same test applied to other bearing members which have not been treated, and under the same conditions for a much shorter time, results in the ruin of the surfaces of said untreated bearing members. For example, pistons or piston rings will be scored and scuffed so as to be useless and cylinders in engines to be of any further use must be rebored and refinished. The ferruoso-ferric phosphate coating is produced by the action of the free phosphoric acid upon the ferrous articles at their surfaces where the acid attacks. The solution being saturated with iron phosphate will not take any more, whereupon the iron phosphate coatings produced by the action of the free phosphoric acid upon the ferrous articles stays on the articles very closely adherent and interknit therewith. The subsequent washing treatment in an emulsion of oil and water is beneficial in that it produces the results of toughening the coating, absorption of oil in the coating, makes a uniform appearance and a better adherence of the coating to the iron. Such coating interposed between the iron of one bearing member and that of another coacting therewith makes it impossible for the like ferrous metals to come within the radius of molecular attraction, one of the other, under any conditions. Such coating is very tough and resistant to removal or breaking down through any wiping or rubbing action and is closely interknit and adherent with the iron article on which it is produced at all workable ranges of temperature. Bearing surfaces are protected against cutting and wearing even in those cases where lubrication is scant or for short intervals is wholly absent.

It is to be understood that with reference to bearing surfaces, this invention is applicable to the treatment of the surfaces which are in bearing contact irrespective of whether the surface is on a moving part of the bearing or a fixed part thereof. For example a piston ring treated in accordance with our method of treatment is adapted to rapidly move inside of and with bearing engagement against the inner walls of a cylinder. But the same beneficial effect would be present if the inner walls of the cylinder were thus treated and the piston ring not treated. Therefore, the invention is not to be limited necessarily in any way to the movable members of bearings but is also applicable to the stationary members thereof.

It is also to be understood that where we mention the presence of black oxide of manganese in the concentrated solution of phosphoric acid, not only such black oxide of manganese but other metallic oxides of an equivalent nature may be used as substitutes therefor. Various other metallic oxides other than the black oxide of the metal manganese may be substituted and the invention is to be in no sense restricted to the use of such black oxide of manganese, or otherwise than as required by the terms of the claims.

This process has proven very successful and useful and is practically used to a large extent. Having thus desscribed our invention, what we claim and desire to secure by Letters Patent is:

1. The method of treating members of ferrous material, said members being designed for bearing engagement with other ferrous members which consists, in subjecting said members to the action of a solution of phosphoric acid saturated with iron phosphate, in which solution there is free phosphoric acid, for a period of time until all evolution of gas ceases, and then washing said members in an emulsion of water and a soluble oil.

2. The herein described method of producing a non-scoring or non-scuffing surface for articles of ferrous material designed to bear upon and in contact with other ferrous members which consists, in immersing said articles in a solution of phosphoric acid saturated with iron phosphates and having a small amount of free phosphoric acid therein for a period of time until evolution of gases from said article ceases, withdrawing the articles from said solution, and washing them in an emulsion of water and a soluble oil.

3. The method of treating an article of ferrous composition, said article being designed for bearing engagement with another article of ferrous material which consists, in immersing the article to be treated in a bath consisting of a solution of phosphoric acid saturated with iron phosphate and diluted with water, said bath containing approximately 6% free phosphoric acid and being heated to a temperature approximating but less than 212° F., the immersion continuing until reaction of the phosphoric acid on the ferrous article is complete, evidenced by a cessation of gas evolution, withdrawing the articles from said bath and subjecting them to immersion in an emulsion of water and a soluble oil.

4. The method of treating a ferrous article to give the same a desired bearing surface which consists, in immersing said article in a solution made by diluting one part of a concentrated solution of phosphoric acid saturated with iron phosphates with approximately nine parts of water, said diluted solution having approximately 6% free phosphoric acid therein, said solution being heated to a temperature which is less than 212° F., the immersion continuing until reaction of the free acid on the ferrous article is complete, evidenced by a cessation of gas evolution, withdrawing the article thus treated and immersing it and carrying it through an emulsion of water and a soluble oil.

JOHN H. BALLARD.
WILLIAM H. SPENCER.